United States Patent [19]
Iyengar et al.

[11] Patent Number: 5,729,190
[45] Date of Patent: Mar. 17, 1998

[54] DYNAMIC COMPARATOR CIRCUIT FOR CACHE MEMORIES

[75] Inventors: Narasimhan Iyengar; Scott Eliot McCormack, both of Austin, Tex.

[73] Assignee: International Business Machines Corporation, Armonk, N.Y.

[21] Appl. No.: 688,638

[22] Filed: Jul. 29, 1996

[51] Int. Cl.[6] ............................................. G06F 7/02
[52] U.S. Cl. ................................. 340/146.2; 365/189.07
[58] Field of Search ..................... 340/146.2; 365/189.07

[56] References Cited

U.S. PATENT DOCUMENTS

| | | | |
|---|---|---|---|
| 5,386,207 | 1/1995 | Lin | 327/65 |
| 5,414,310 | 5/1995 | Fattaruso | 327/71 |
| 5,488,320 | 1/1996 | Carvella et al. | 327/70 |
| 5,642,320 | 6/1997 | Jang | 365/189.07 |

*Primary Examiner*—Margaret Rose Wambach
*Attorney, Agent, or Firm*—Andrew J. Dillon

[57] ABSTRACT

A dynamic comparator circuit for a cache memory within a computer system is disclosed. In accordance with an illustrative embodiment of the present disclosure, the dynamic comparator circuit includes a first transistor, a first set of two transistors and a second set of two transistors. The first transistor is connected between an output and ground, having its gate connecting to a precharge signal. The first set of two transistors is connected in series between a power supply and the output. The gates of the first set of two transistors are separately connected to a first bit signal and a second bit signal. The second set of two transistors is also connected in series between the power supply and the output. The gates of the second set of two transistors are separately connected to a complement of the first bit signal and a complement of the second bit signal such that a transition occurs in an output signal when the first bit signal matches the second bit signal. In this manner, the dynamic comparator circuit is unaffected by process conditions and variations in operating conditions.

11 Claims, 6 Drawing Sheets

DYNAMIC COMPARATOR CIRCUIT FOR CACHE MEMORIES

BACKGROUND

1. Technical Field

The present disclosure relates to an apparatus for data storage in general and, in particular, to a cache memory for storing data within a computer system. Still more particularly, the present disclosure relates to a dynamic comparator circuit for utilization with a cache memory within a computer system.

2. Description of the Prior Art

Many high-performance data processing systems include both a system memory and a cache memory. A cache memory is a relatively high-speed memory that stores a copy of information that is also stored in one or more portions of the system memory. The cache memory can be integrated within a processor device (on-chip) of the data processing system or remain separate from the processor device of the data processing system.

A dynamic comparator circuit is commonly utilized in a cache memory for comparing a tag address of an incoming word against a tag address of an internally stored word. If the incoming tag matches with the stored tag, the dynamic comparator signals that there is a match (or a "hit" in cache memory terminology).

A match is assumed to be the default condition in a traditional dynamic comparator circuit. When a miss occurs, the match condition is momentarily transitioned to a miss condition within an evaluation cycle. One major drawback of this design is that most of the circuit logic subsequent to the comparator circuit must depend on detecting this transitional miss condition. Further, because there is no transition during a match, a self-timed logic or a clock-driven logic is typically utilized for sampling the output at a pre-determined time in order to determine a match condition. If the output is in a match state at the time of sampling, it is considered to be a match condition, and if the output has made a transition at the time of sampling, it is considered to be a miss condition. The decision as to when to sample the output is one of careful analysis and risk taking. Some circuits produce a delay to match the propagation delay of the dynamic comparator after which the output is sampled. Other circuits utilize a system clock to sample the output of the dynamic comparator at a pre-determined time. Regardless of the method utilized, all of these circuits require certain margins to ensure the output of the dynamic comparator has properly settled before any sampling is performed. However, this margin is not constant and may vary depending on process conditions and operation conditions. Needless to say, a wide fluctuation of process conditions and operation conditions may cause the dynamic comparator circuit to yield erroneous results.

Consequently, it would be desirable to provide an improved dynamic comparator circuit for a cache memory within a computer system that is not subject to such variations.

SUMMARY

In view of the foregoing, it is therefore an object of the present disclosure to provide an improved apparatus for data storage.

It is another object of the present disclosure to provide an improved cache memory for storing data within a computer system.

It is yet another object of the present disclosure to provide an improved dynamic comparator circuit for a cache memory within a computer system.

In accordance with an illustrative embodiment of the present disclosure, the dynamic comparator circuit includes a first transistor, a first set of two transistors, and a second set of two transistors. The first transistor is connected between an output and ground, having its gate connecting to a precharge signal. The first set of two transistors is connected in series between a power supply and the output. The gates of the first set of two transistors are separately connected to a first bit signal and a second bit signal. The second set of two transistors is also connected in series between the power supply and the output. The gates of the second set of two transistors are separately connected to a complement of the first bit signal and a complement of the second bit signal such that a transition occurs in an output signal when the first bit signal matches the second bit signal. In this manner, the dynamic comparator circuit is unaffected by process conditions and variations in operating conditions.

All objects, features, and advantages of the present disclosure will become apparent in the following detailed written description.

BRIEF DESCRIPTION OF THE DRAWINGS

The disclosure itself, as well as an illustrative mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present disclosure may be implemented in any data processing system having a cache memory. Also, it is understood that the features of the present disclosure may be applicable to a primary cache, a secondary cache, a dynamic random access memory, and the like, wherever a dynamic comparator circuit is applicable.

Figure 1:
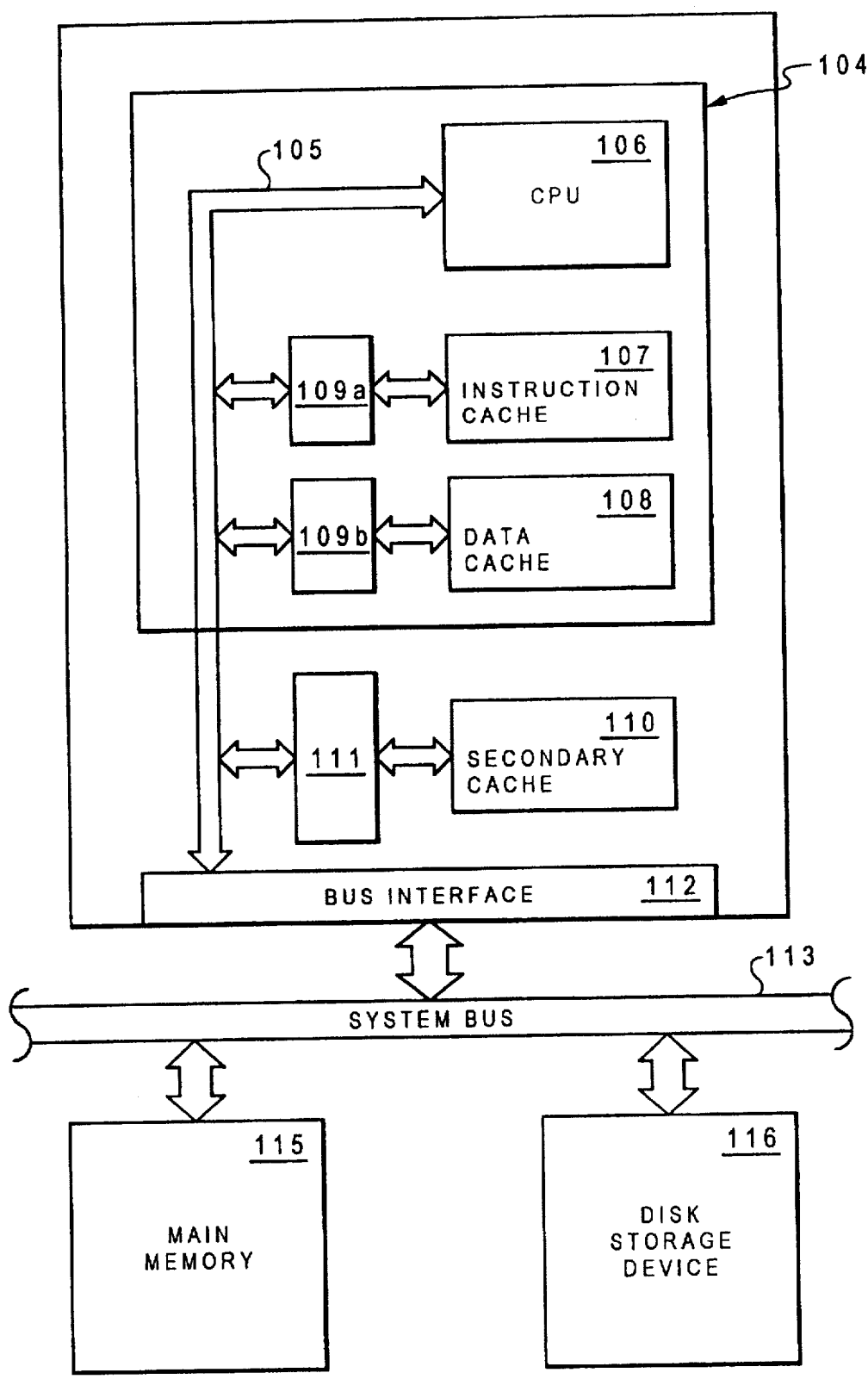
FIG. 1 is a block diagram of a typical data processing system in which a cache memory having a dynamic comparator circuit in accordance with an illustrative embodiment of the disclosure may be incorporated.

Referring now to the drawings and in particular to FIG. 1, there is illustrated a block diagram of a typical data processing system in which a cache memory having a dynamic comparator circuit in accordance with an illustrative embodiment of the disclosure may be incorporated. As shown, processor 104, having a CPU 106 which may be of a superscalar RISC type, is constructed as a single-chip device comprising on-chip instruction cache 107 and data cache 108. Both caches 107, 108 are connected to CPU 106 by separate paths within a local bus structure. Instruction cache 107 is connected to local bus 105 via cache controller 109a, while data cache 108 is connected to local bus 105 via cache controller 109b. A secondary cache 110 is also connected to local bus 105 via cache controller 111. Secondary cache 110 is usually much larger than either instruction cache 107 or data cache 108, and access to secondary cache 110 is also somewhat slower than to either instruction cache 107 or data cache 108. CPU 106 is also connected to system bus 113 via bus interface 112 in which timing and control translations between local bus 105 and system bus 113 are taking place. In addition, a main memory 115 and a disk storage device 116 are coupled to system bus 113.

Instruction cache 107 and data cache 108 may be addressed by effective (i.e., untranslated) addresses as well as by real (i.e., physical) addresses. Thus, local bus 105 within processor 104 has a number of address buses, including effective address buses, real address buses, and instruction address buses. In contrast, secondary cache 110 is typically addressed by real addresses only.

Figure 2:
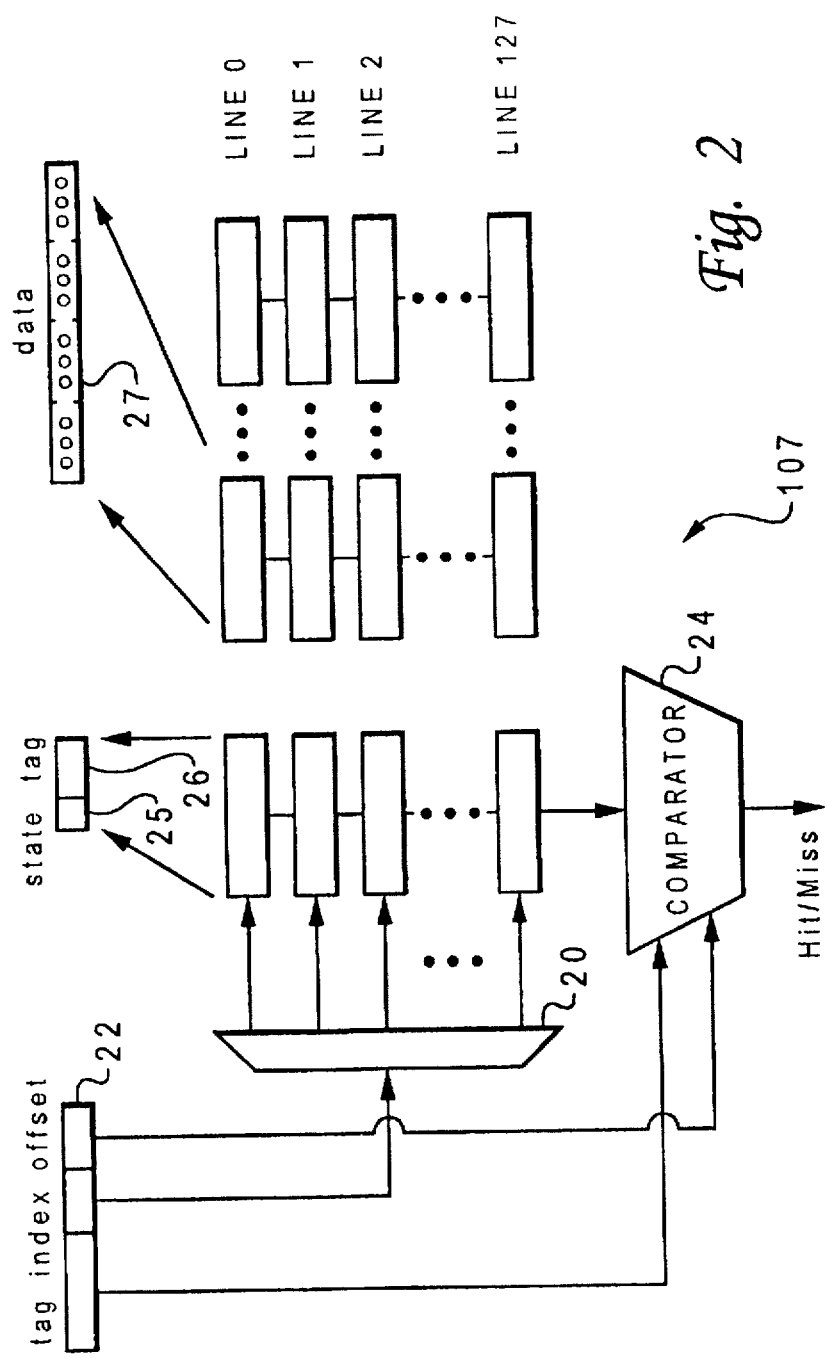
FIG. 2 is a block diagram of the main components within the instruction cache (or data cache) of FIG. 1.

With reference now to FIG. 2, there is illustrated a block diagram of the main components within instruction cache 107 (or data cache 108) of FIG. 1. As shown, instruction cache 107 is configured as a one-way cache having 128 cache lines, from line 0 to line 127. Each word within a cache line includes state bits 25, an address tag 26, and a data block 27. State bits 25 are utilized to implement the standard four-state MESI (modified-exclusive-shared-invalid) protocol which is well-known to those ordinarily skilled in the art of cache memory design. After one of the 128 cache lines has been selected by decoding an address 22 with decoder 20, address tag 26 of a selected word within the selected cache line is utilized for comparison with a tag from an address 22 in order to determine whether there is a cache "hit" or "miss." A match between address tag 26 and the tag from address 22 indicates a cache "hit," and a hit/miss output is provided from comparator circuit 24 for indicating such a condition. When there is a cache "hit," a data word will be output from instruction cache 107.

Figure 3:
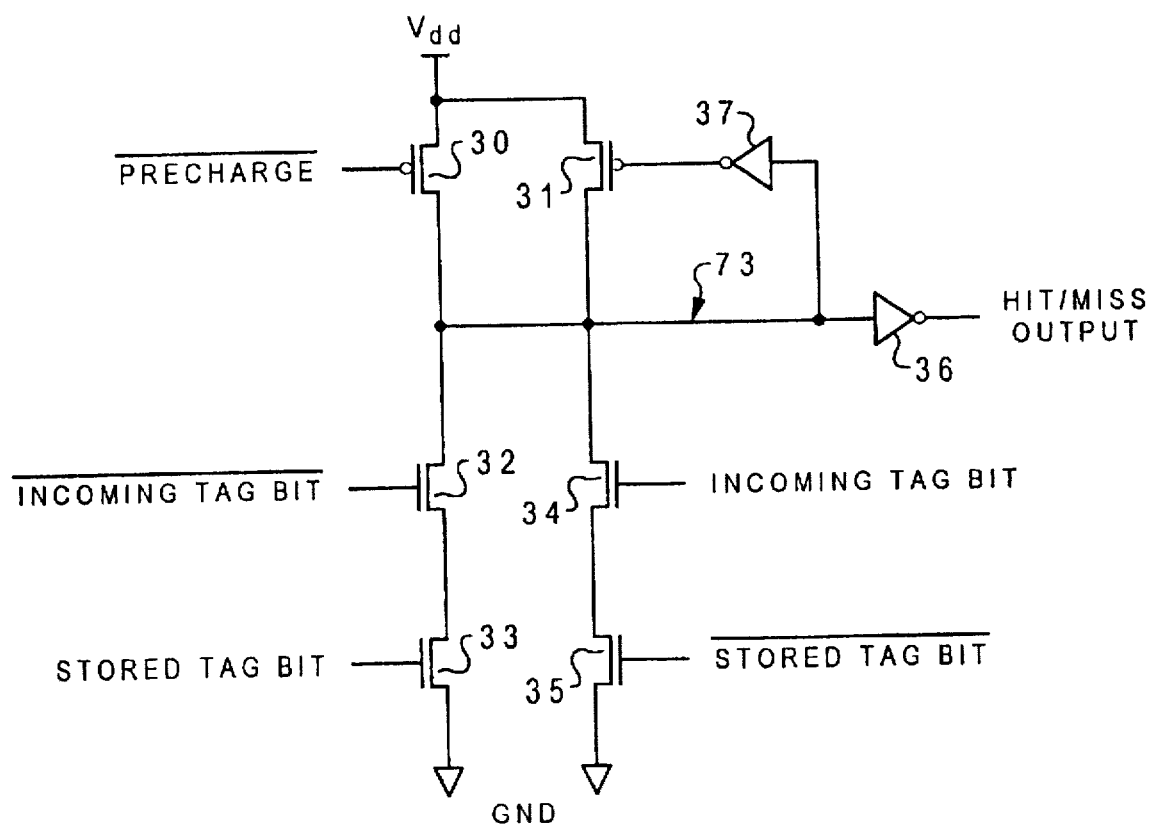
FIG. 3 is a schematic diagram of a dynamic comparator circuit for a cache memory according to prior art.

Referring now to FIG. 3, there is depicted a schematic diagram of a dynamic comparator circuit according to prior art.

Before the comparison operation, match line 73 is precharged to a "high" state through a p-channel transistor 30 while a stored tag bit and an incoming tag bit are both precharged to a "low" state. The "high" state on match line 73 is prevented from drifting by transistor 31 and inverter 37. Subsequently, an incoming tag bit and its complement bit from instruction 22 simultaneously appear at the gate of n-channel transistor 34 and at the gate of n-channel transistor 32, respectively. In addition, a stored tag bit and its complement bit from instruction cache 107 simultaneously appear at the gate of n-channel transistor 33 and at the gate of n-channel transistor 35, respectively. Then, the comparison operation commences. If the incoming tag bit from instruction 22 matches with the stored tag bit from instruction cache 107, match line 73 will remain in its precharged "high" state and the hit/miss output as appears at the output of inverter 36 will remain in a "low" state throughout an evaluation cycle. This is depicted by waveform 54 of FIG. 5.

However, if the incoming tag bit from instruction 22 does not match the stored tag bit from instruction cache 107, either transistor pair 32, 33 or transistor pair 34, 35 will be turned on to drain off the charges from match line 73. As a result, the hit/miss output as appears at the output of inverter 36 will momentarily change from a "low" state to a "high" state during the evaluation cycle. This is depicted by waveform 56 of FIG. 5.

Figure 4:
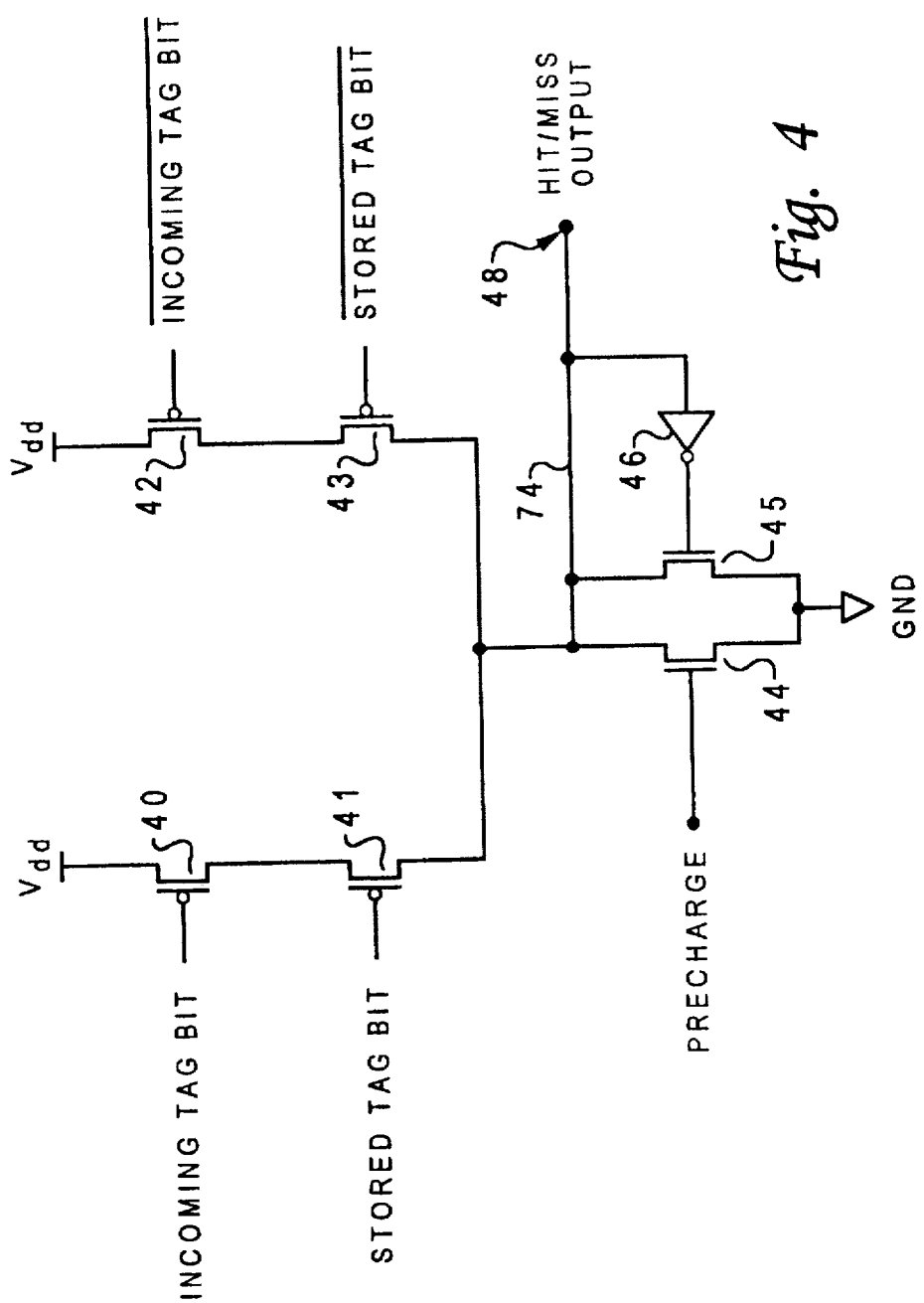
FIG. 4 is a schematic diagram of a dynamic comparator circuit according to an illustrative embodiment of the present disclosure.

With reference now to FIG. 4, there is depicted a schematic diagram of a dynamic comparator circuit according to an illustrative embodiment of the disclosure. As shown, a pair of p-channel transistors 40, 41 is connected in series between a power supply, $V_{dd}$, and a match line 74. The gate of transistor 40 is controlled by an incoming tag bit from an instruction 22 while the gate of transistor 41 is controlled by a stored tag bit from instruction cache 107. The complement bits of the incoming tag bit and the stored tag bit are separately controlling the gate of a p-channel transistor 42 and the gate of a p-channel transistor 43, respectively. Transistor pair 42, 43 is also connected between $V_{dd}$ and match line 74. In addition, a pair of n-channel transistors 44, 45 is connected in parallel between match line 74 and Ground. The gate of transistor 44 is connected to a precharge signal while the gate of transistor 45 is connected to match line 74 via an inverter 46.

Before the comparison operation, match line 74 is precharged to a "low" state through transistor 44. The purpose of transistor 45 and inverter 46 is to prevent the "low" state of match line 74 from drifting. Subsequently, the incoming tag bit and its complement bit from instruction 22 simultaneously appear at the gate of transistor 40 and at the gate of transistor 42, respectively. In addition, stored tag bit and its complement bit from instruction cache 107 simultaneously appear at the gate of transistor 41 and at the gate of transistor 43, respectively. Then, the comparison operation commences. If the incoming tag bit from instruction 22 does not match with the stored tag bit from instruction cache 107 (e.g., incoming tag bit is a "1" and stored tag bit is a "0"), then only one of transistor pair 40, 41 will be turned on. As a result, match line 74 will remain in its precharged "low" state and the hit/miss output 48 will remain in the "low" state throughout the evaluation cycle. This is depicted by waveform 58 of FIG. 5.

However, if the incoming tag bit from instruction 22 matches the stored tag bit from instruction cache 107 (e.g., incoming tag bit is a "1" and stored tag bit is also a "1"), then any one of transistor pair 40, 41 or transistor pair 42, 43 will be turned on to raise the voltage on match line 74 to a "high" state. As a result, the hit/miss output will momentarily change from a "low" state to a "high" state during the evaluation cycle. This is depicted by waveform 60 of FIG. 5.

Figure 5:
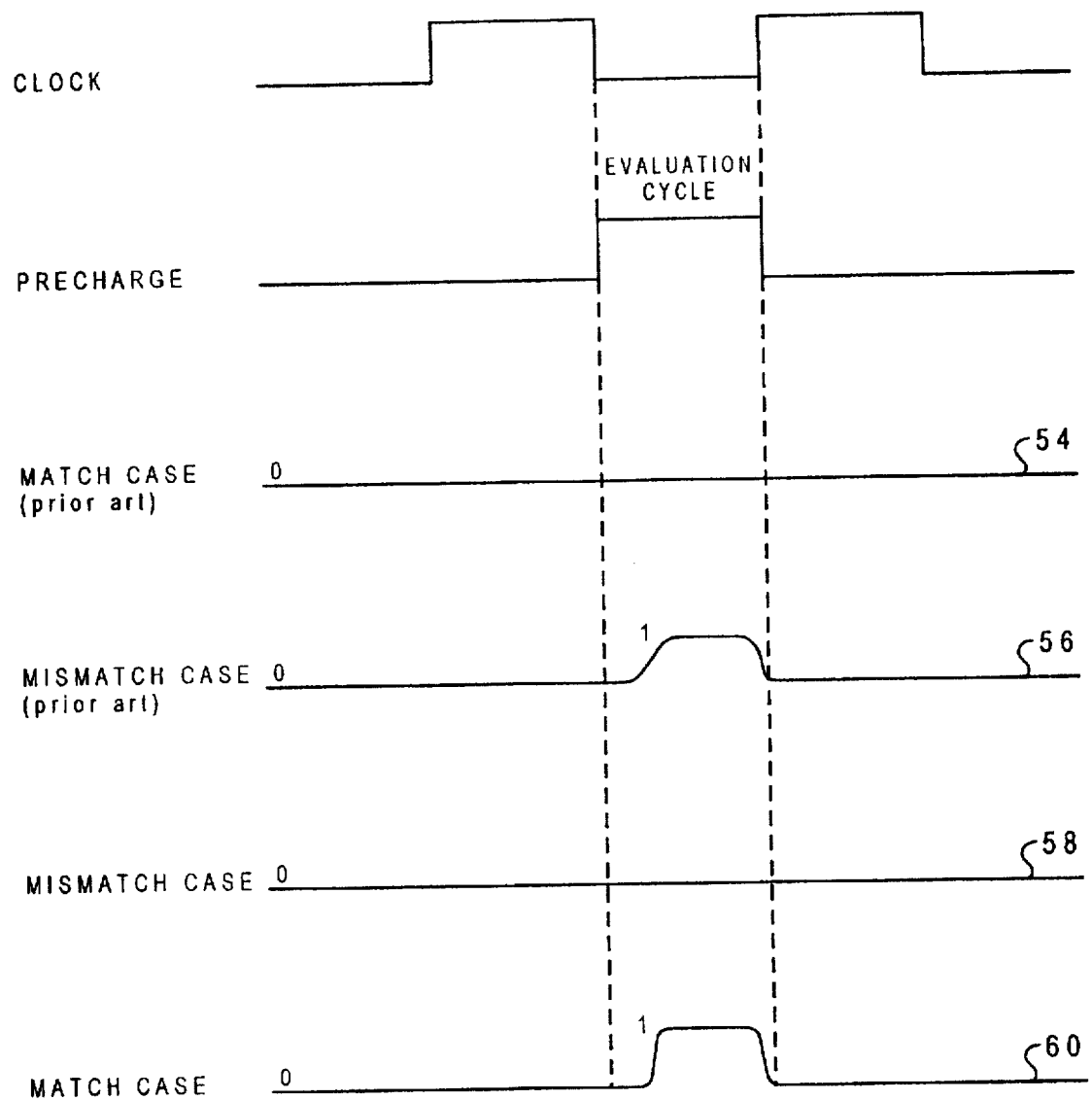
FIG. 5 is a timing diagram of several output waveforms from the dynamic comparator circuits of FIG. 3 and FIG. 4.

Referring now to FIG. 5, there is illustrated a timing diagram of several waveforms from the hit/miss output of the comparator circuit under prior art and the comparator circuit under the present disclosure. Under the prior art comparator circuit, a cache "hit" is considered as the default condition. Thus, there is only a transition from a "low" state to a "high" state during the evaluation cycle if there is a mismatch between the incoming tag bit and the stored tag bit, as depicted by waveform 56. On the contrary, under the dynamic comparator circuit of the present disclosure, a cache "miss" is considered as the default condition. Hence, when there is a match between the incoming tag bit and the stored tag bit, a transition occurs from a "low" state to a "high" state during the evaluation cycle, as depicted by waveform 60. It is understood that such transition can also be from a "high" state to a "low" state by adding an inverter or the like at the hit/miss output of the dynamic comparator circuit of the present disclosure.

Figure 6:
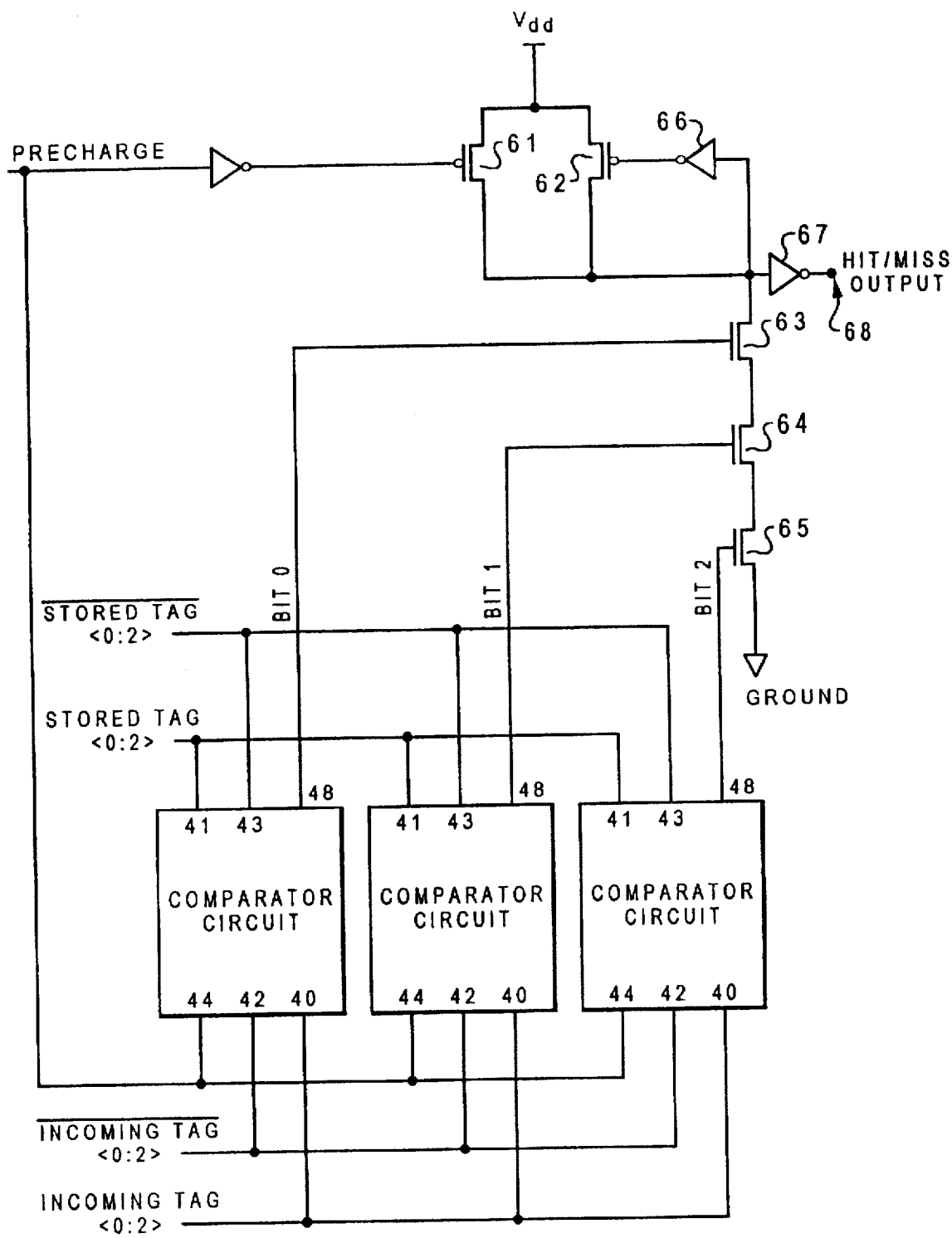
FIG. 6 is a schematic-block diagram of an implementation of the dynamic comparator circuit in accordance with an illustrative embodiment of the present disclosure.

With reference now to FIG. 6, there is illustrated a schematic-block diagram of an implementation of the dynamic comparator circuit in accordance with an illustrative embodiment of the disclosure. As shown, three dynamic comparator circuit blocks are cascaded together to form a three-bit tag comparator. Each dynamic comparator circuit block is identical, and each number within the dynamic comparator circuit block represents a gate input of the transistor as illustrated in FIG. 4.

Hence, each bit of the three-bit incoming tag is respectively connected to the gate of transistor 40 of each comparator circuit block while each complement bit of the three-bit incoming tag is respectively connected to the gate of transistor 42 of each comparator circuit block. Similarly, each bit of the three-bit stored tag is respectively connected to the gate of transistor 41 of each comparator circuit block while each complement bit of the three-bit stored tag is respectively connected to the gate of transistor 43 of each comparator circuit block. The precharge signal is connected to the gate of transistor 44 of each comparator circuit block and is common to all circuit blocks. Output 48 from each comparator circuit block is individually connected to n-channel transistors 63, 64 and 65. In essence, n-channel transistors 61–65 and inverters 66–67 together form a dynamic NAND gate such that there must be a transition from a "low" state to a "high" state in output 48 of all comparator circuit blocks in order to produce a match condition at hit/miss output 68.

As has been described, the present disclosure provides an improved dynamic comparator circuit for a cache memory within a computer system. Because this dynamic comparator circuit produces a transition state when there is a match instead of a mismatch as is in the prior art design, this circuit design is much less susceptible to errors caused by process and operation condition variations.

While the disclosure has been particularly shown and described with reference to an illustrative embodiment, it will be understood by those skilled in the art that various changes in form and detail may be made therein without departing from the spirit and scope of the disclosure.

What is claimed is:

1. A dynamic comparator circuit comprising:

a first transistor connected between an output and a ground, wherein the gate of said first transistor is connected to a precharge signal;

a first set of two transistors connected in series between a power supply and said output, wherein the gates of said first set of two transistors are separately connected to a first bit signal and a second bit signal;

a second set of two transistors connected in series between said power supply and said output, wherein the gates of said second set of two transistors are separately connected to a complement of said first bit signal and a complement of said second bit signal, wherein a transition occurs in an output signal in response to said first bit signal matching said second bit signal.

2. The dynamic comparator circuit according to claim 1, wherein said first set of two transistors includes two p-channel transistors.

3. The dynamic comparator circuit according to claim 1, wherein said second set of two transistors includes two p-channel transistors.

4. The dynamic comparator circuit according to claim 1, wherein said first transistor is an n-channel transistor.

5. The dynamic comparator circuit according to claim 1, wherein said first bit signal is an incoming tag bit signal and said second bit signal is a stored tag bit signal.

6. The comparator circuit according to claim 1, wherein said comparator circuit further includes a second transistor connecting between said output and said ground, wherein the gate of said second transistor is connected to said output via an inverter.

7. The dynamic comparator circuit according to claim 1, wherein said match condition between said first bit signal and said second bit signal can be a logical "1" or a logical "0."

8. A cache memory having a dynamic comparator circuit for bit comparison, said cache memory comprising:

a tag array and a data array;

a decoder for decoding an incoming address to locate a tag stored within said tag array;

a comparator for comparing a tag within said incoming address against said tag stored within said tag array such that a data word is output from said data array in response to a match condition exists for said comparison, wherein said dynamic comparator circuit includes a first pair of transistors connecting in series between a power supply and an output, wherein the gates of said first pair of transistors are separately receiving a bit signal from said incoming tag and a bit signal from said stored tag;

a second pair of transistors connecting in series between said power supply and said output, wherein the gates of said second pair of transistors are separately receiving a complement of said bit signal from said incoming tag and a complement of said bit signal from said stored tag; and a transistor connected between said output and a ground, wherein the gate of said transistor is connected to a precharge signal.

9. The cache memory having a dynamic comparator circuit for bit comparison according to claim 8, wherein said first pair of transistors includes two p-channel transistors.

10. The cache memory having a dynamic comparator circuit for bit comparison according to claim 8, wherein said second pair of transistors includes two p-channel transistors.

11. The cache memory having a dynamic comparator circuit for bit comparison according to claim 8, wherein said one transistor is an n-channel transistor.

* * * * *